United States Patent [19]

Kanno

[11] Patent Number: 5,777,881
[45] Date of Patent: Jul. 7, 1998

[54] METHOD OF DECIDING CONTROL PARAMETERS OF HEAT TREATMENT INSTRUMENT AND APPARATUS THEREOF

[75] Inventor: Soichi Kanno, Shiroyamamachi, Japan

[73] Assignee: Tokyo Electron Limited, Tokyo, Japan

[21] Appl. No.: 787,110

[22] Filed: Jan. 22, 1997

[30] Foreign Application Priority Data

Jan. 23, 1996 [JP] Japan .................................. 8-028481

[51] Int. Cl.⁶ .......................... G06F 19/00; G05B 11/42
[52] U.S. Cl. .................... 364/477.03; 364/162; 364/553; 364/477.01
[58] Field of Search .................. 364/477.03, 477.02, 364/477.01, 468.28, 553, 148, 149, 150, 152, 162, 557, 477.04, 477.05, 477.06; 432/36, 51

[56] References Cited

U.S. PATENT DOCUMENTS 4,479,176  10/1984  Grimshaw ........................... 364/152
4,714,988  12/1987  Hiroi et al. ........................ 364/158 X
5,272,644  12/1993  Katsumata et al. ................ 364/477.01

*Primary Examiner*—Joseph Ruggiero
*Attorney, Agent, or Firm*—Oblon, Spivak, McClelland, Maier & Neustadt, P.C.

[57] ABSTRACT

A method of deciding temperature control parameters of a heat treatment instrument for performing a heat treatment on a target object by increasing a temperature of a heat furnace of the heat treatment instrument, in accordance with the temperature control parameters initialized, obtaining a transfer function of an entire system of the heat treatment instrument, based on a heat treatment temperature of the heat furnace of the heat treatment instrument, obtaining a transfer function of the heat furnace on the basis of the transfer function of the entire system and the temperature control parameters, and obtaining temperature control parameters to be adopted in actual processing, based on a target transfer function of the entire system of the heat treatment instrument and the transfer function of the heat furnace.

6 Claims, 4 Drawing Sheets

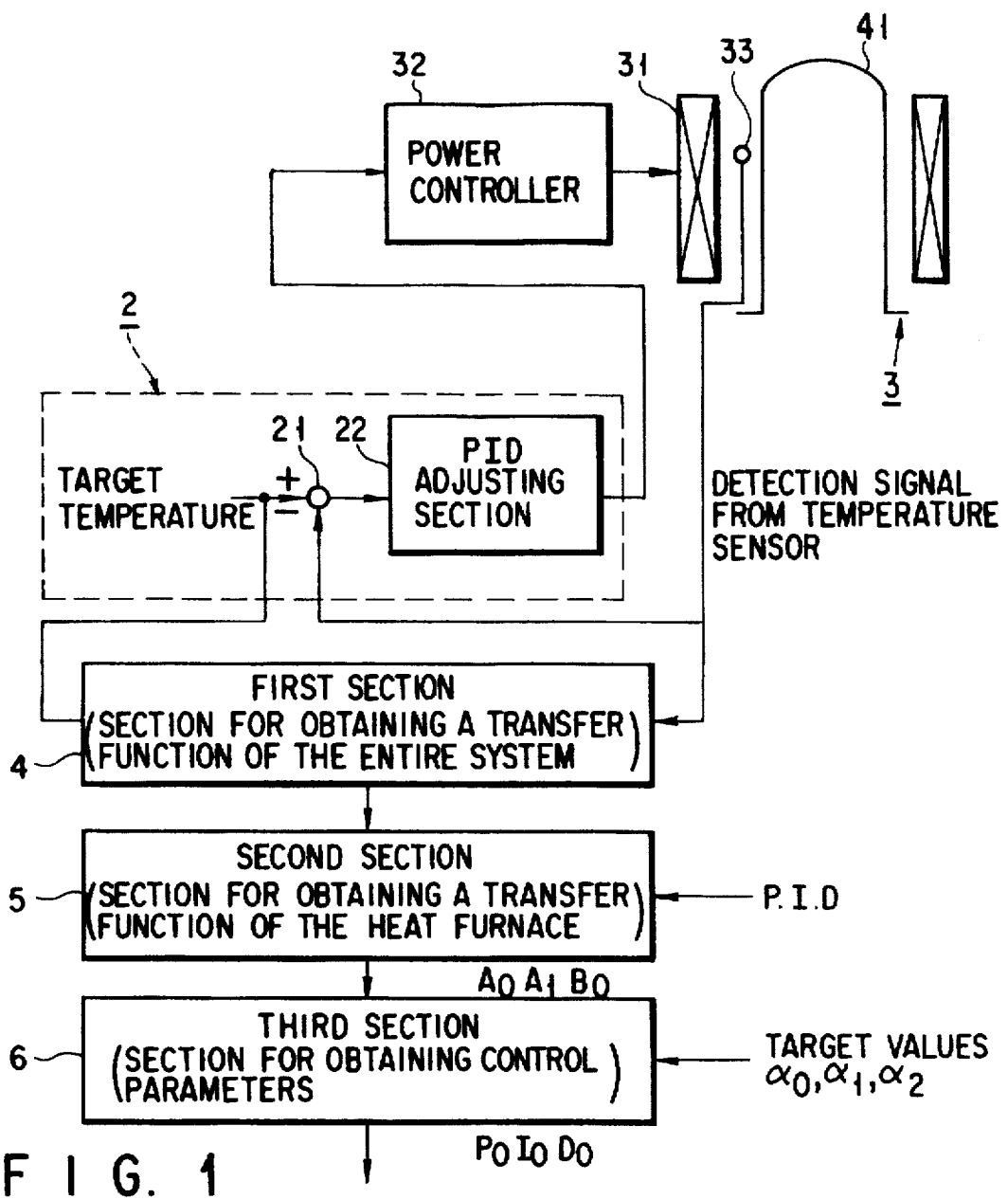
F I G. 1
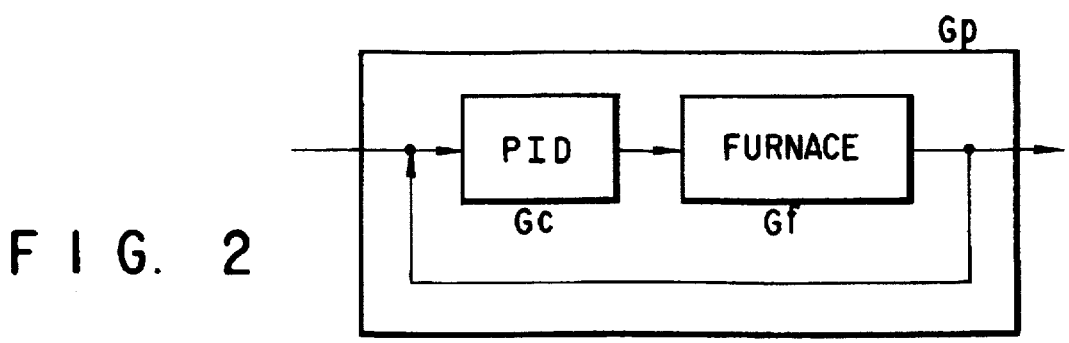
F I G. 2

METHOD OF DECIDING CONTROL PARAMETERS OF HEAT TREATMENT INSTRUMENT AND APPARATUS THEREOF

BACKGROUND OF THE INVENTION

The present invention relates to a method of deciding control parameters of a heat treatment instrument, for example, for performing batch-processing on semiconductor wafers, and an apparatus thereof.

Several manufacturing processes for a semiconductor device include a heat treatment such as CVD (chemical vapor deposition), an oxidation treatment or the like. A vertical type heat treatment instrument has been known as a kind of apparatus by which a heat treatment as described above is carried out in a batch scheme. In a heat treatment using this apparatus, a number of wafers are firstly placed on a wafer boat, as if they are put on a shelf, and thereafter, this wafer boat is loaded into a reaction tube having a double-tube structure, and is heated to a predetermined temperature by a heater. Simultaneously, a treatment gas is introduced to perform processing while the gas is exhausted by an exhaust tube.

Meanwhile, heat treatment processing for a wafer requires temperature control with a high accuracy with respect to a heat treatment environment. For example, a thermo-sensor is provided in the vicinity of the outer surface of a reaction tube, and a detection signal is fed back from the thermo-sensor to carry out PID operation by means of a PID adjusting section, so that the power amount of the heater is controlled by a power controller. In case where temperature control is thus carried out, it is necessary that the temperature control characteristic satisfies required performance, i.e., the temperature rise curve of the inside of the heating furnace must be equal to a target curve. Therefore, control parameters (P, I, and D) of the temperature controller must be decided and set to optimal values. Conventionally, based on trial and error, an operator decides and adjusts values of P, I, and D while observing time-based changes in detected values of a thermo-sensor, such that the temperature rise curve is optimized.

However, adjustment of control parameters requires skill and is mainly dependent on trial and error, so that much time is necessary for adjustment operation. Besides, a heater is divided into a plurality of sections, e.g., five heater sections in the vertical direction, in view of uniformity (or inter-surface temperature uniformity) of the treatment temperature in the direction (in the vertical direction) in which wafers are disposed on the wafer boat. Therefore, control parameters must be adjusted for each heater section, and thus, the adjustment operation is greatly complicated.

Hence, the present invention has an object of providing a method of adjusting control parameters and an apparatus thereof, by which those control parameters can be easily decided that provide aimed temperature control characteristics, in case where temperature control is carried out, for example, for semiconductor wafers, in a heat treatment apparatus.

BRIEF SUMMARY OF THE INVENTION

The present invention provides a method of deciding temperature control parameters of a heat treatment instrument for performing a heat treatment on a target object, comprising steps of: increasing a temperature of a heat furnace of the heat treatment instrument, in accordance with the temperature control parameters initialized; obtaining a transfer function of an entire system of the heat treatment instrument, based on a heat treatment temperature of the heat furnace of the heat treatment instrument; obtaining a transfer function of the heat furnace on the basis of the transfer function of the entire system and the temperature control parameters; obtaining temperature control parameters to be adopted in actual processing, based on a target transfer function of the entire system of the heat treatment instrument and the transfer function of the heat furnace.

An apparatus of deciding control parameters of a heat treatment instrument, comprising: a temperature detection section provided in a heat furnace for subjecting a target object to a heat treatment; an adjusting section for outputting a control signal for controlling supply power to a heat source of the heat furnace, from the control parameters based on a deviation between a detected temperature detected by the temperature detection section and a target temperature value; a first transfer function calculation section for obtaining a transfer function of an entire system including the adjusting section and the heat furnace, based on temperature detection data from the temperature detection section when a temperature of the heat furnace is increased; a second transfer function calculation section for obtaining a transfer function of the heat furnace, based on the transfer function of the entire system obtained by the transfer function calculation section and control parameters of the adjusting section used when obtaining the temperature detection data; and a control parameter calculation section for obtaining control parameters of the adjusting section, to be used in a heat treatment, based on the transfer function obtained by the second transfer function calculation section and the transfer function of the entire system as a target.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view schematically showing the structure of a heat treatment instrument including an apparatus of deciding control parameters according to an embodiment of the present invention;

FIG. 2 is a block diagram of the entire system of the heat treatment instrument;

DETAILED DESCRIPTION OF THE INVENTION

Figure 3:
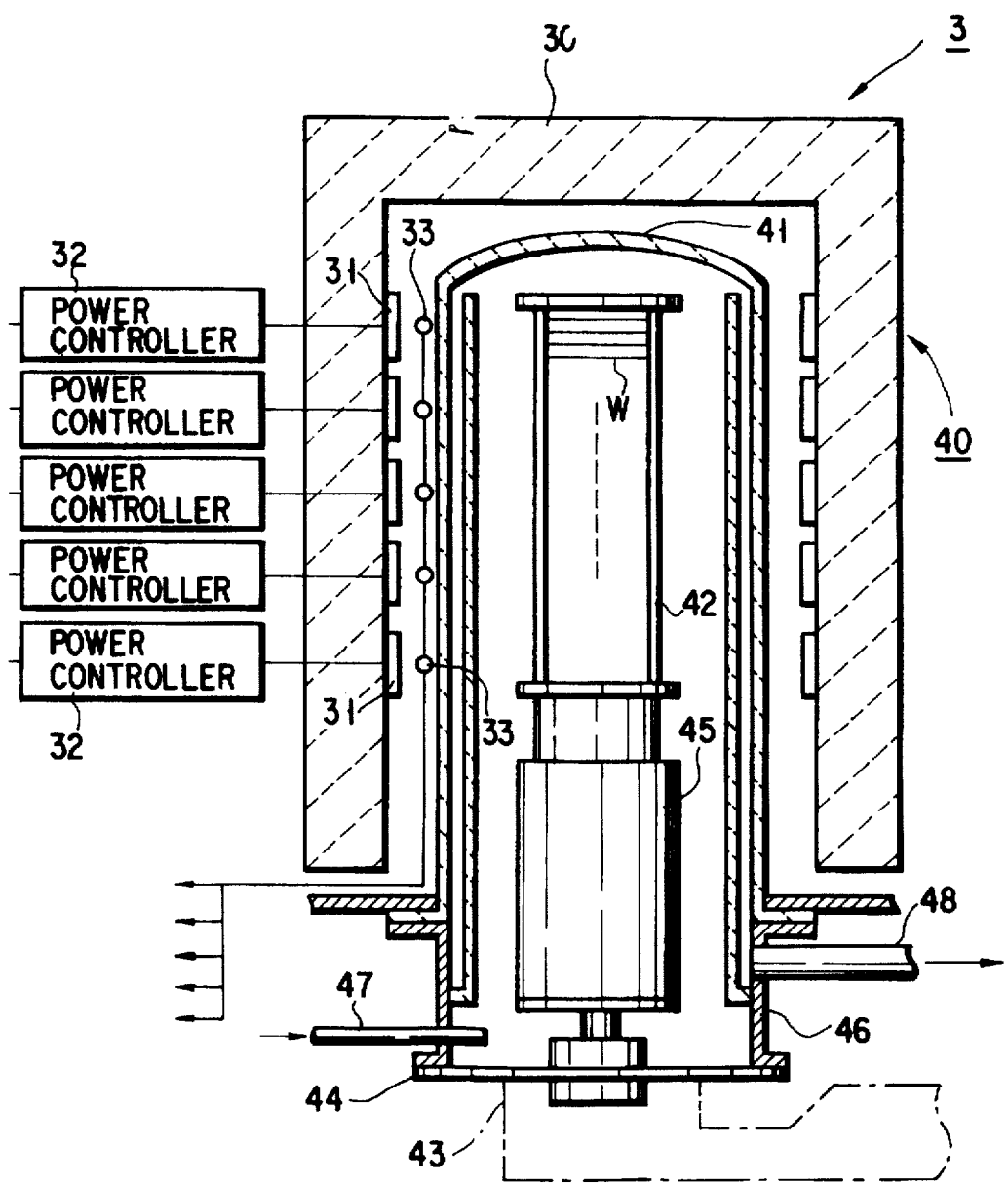
FIG. 3 is a cross-section of a vertical type heat treatment instrument to which the present invention is applied.

According to an apparatus for deciding control parameters of a vertical type heat treatment instrument shown in FIG. 1, a temperature controller 2 is provided to control the temperature of a heat furnace 3. The control signal from the temperature controller 2 is supplied to a power controller 32 of the heat furnace 3, and the electric energy is controlled by the heater 31.

As will be specifically described later, the heat furnace 3 is arranged so as to surround a vertical type reaction tube 41, and comprises a heater 31 including a resistance heat element as a heat source. The temperature controller 2 takes in and feeds back a detected temperature from a thermosensor 33 of a temperature detecting section provided between the heater 31 of the heat furnace 3 and the reaction tube 41. A deviation circuit section 21 compares a target temperature with the detected temperature, and the deviation therebetween is subjected to a PID calculation by a PID adjusting section 22. The calculation result is outputted as a control signal to a power control section 32.

A first section (first processor section) 4 comprises a memory, a CPU and the likes, and functions to write a detected temperature detected by the thermosensor 33 into the memory, when power is supplied to the heater 31 and the temperature of the heat furnace 3 is increased. Hence, the first section 4 further functions to prepare time serial data and to obtain a transfer function Gp with respect to the entire system, by analyzing the data.

A second section (second processor section) 5 functions to calculate and obtain a transfer function Gf of the heat furnace 3, on the basis of the transfer function Gp of the entire system obtained by the first processor section and control parameters of the PID adjusting section 22, e.g., P, I, and D (respectively meaning a proportional factor, an integral factor, and a differential factor).

A third section (third processor section) 6 functions to calculate and obtain P, I, and D of the PID adjusting section used for actual processing, e.g., a function Gc, on the basis of the transfer function Gf of the heat furnace 3 obtained by the second processor section, and a transfer function of the entire system when a target object is actually subjected to a heat treatment in the heat furnace 3, i.e., the transfer function Gp of the entire system as a target when actual processing is carried out. Each of the processor sections 4 to 6 is, for example, constituted by using a micro-computer or the like.

Specifically, the following equation (1) is satisfied where the transfer function Gp of the entire system is Gp as shown in FIG. 2, the transfer function of the heat furnace 3 is Gf, and where the transfer function of the PID adjusting section is Gc.

$$Gp = \frac{GcGf}{1 + GcGf} \quad (1)$$

In the above equation, Gp and Gc are known, and hence, Gf is obtained. Supposing that the target transfer function of the entire system is Gp', Gc is obtained from the above equation, on the basis of Gp' and Gf. Optimum P, I, and D are thus calculated, and the entire system is adjusted on the basis of P, I, and D.

In the above equation, the transfer function Gp of the entire system must be obtained and this function is obtained in the following manner. At first, the transfer function Gp(s) is obtained by the following equation.

$$Gp(s) = \frac{as}{s^3 + a_2 s^2 + a_1 s + as} \quad (2)$$

$$s = \frac{2}{T_3} \frac{1 + Z^{-1}}{1 - Z^{-1}} \quad (3)$$

$$Gp(Z^{-1}) = \frac{B_0 + B_1 Z^{-1} + B_2 Z^{-1} + B_3 Z^{-1}}{1 + A_1 Z^{-1} + A_2 Z^{-1} + A_3 Z^{-1}} = Y \quad (4)$$

where Y/X, $$Y = -A_1 Y Z^{-1} - A_2 Y Z^{-1} - A_3 Y Z^{-1} + B_0 X + B_1 X Z^{-1} + B_2 X Z^{-2} + B_3 X Z^{-3} \quad (5)$$

A and B are obtained by developing Y by a method of least squares. Gp(s) defined when A and B reach constant values becomes the transfer function Gp of the entire system.

Thus, an initial temperature parameter Gc, a transfer function Gp of the entire system, and a transfer function Gf of the heat furnace are used to obtain temperature control parameters in the actual processing, i.e., P, I, and D in the self-consistent field.

In the next, the vertical type heat treatment instrument as described above will be briefly explained on the basis FIG. 3. The reaction tube 41 has a double-tube structure as shown in the vertical type heat treatment instrument 40, and a wafer boat 42 for conveying a number of wafers W mounted thereon is provided above the boat elevator 43, with a cover 44 and a heat insulation cylinder 45 inserted therebetween. In addition, the reaction tube 41 is held, at its lower end, by a manifold 46. A gas inlet pipe 47 for introducing a treatment gas into the reaction tube 41 is inserted into the lower side surface of the manifold 46, and an exhaust pipe 48 for exhausting the treatment gas is connected to the upper side surface of the manifold 46.

Outside the reaction tube 41, a plurality of heaters 31, e.g., five heaters 31 are provided in the vertical direction. These heaters are arranged such that the electric energy for each heater is controlled by a power control section 32. In correspondence with the positions of the heaters 31, five thermo-sensors 33 are provided to be disposed in the vertical direction, in the vicinity of the outer surface of the reaction tube. Note that one set of heater and thermo-sensor is exemplified among groups of the heaters and thermosensors in the explanation of FIG. 1.

Figure 4:
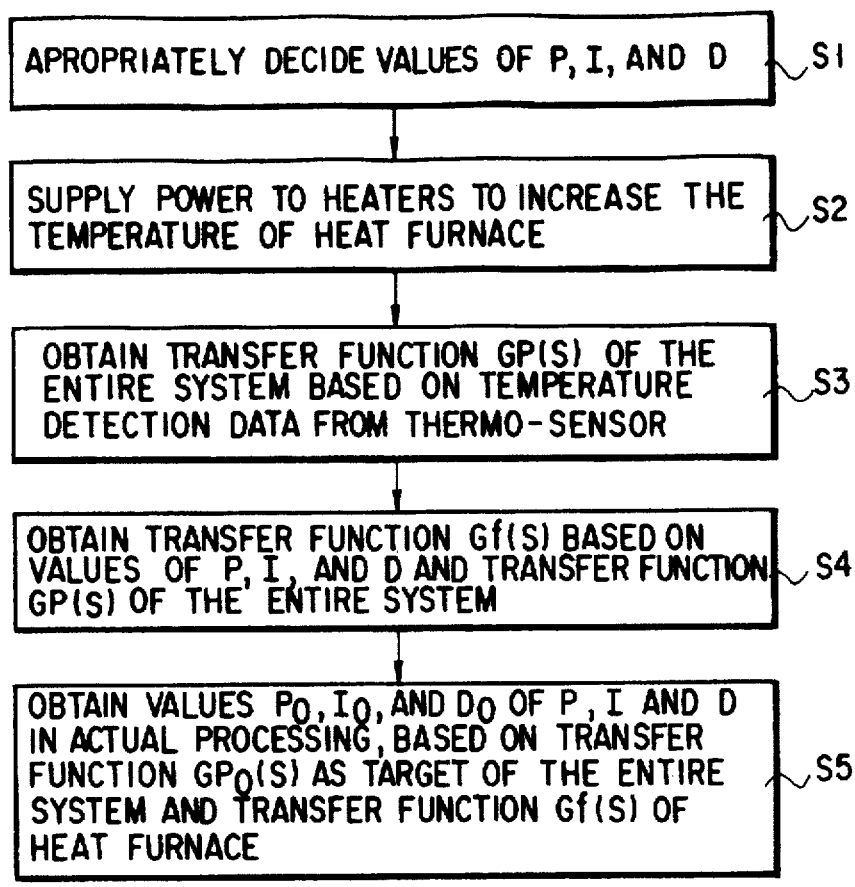
FIG. 4 is a flow-chart showing a method of deciding control parameters of the present invention.

In the next, operation of the above embodiment will be explained more specifically with reference to FIGS. 4 to 6.

At first, each of values P, I, and D of the PID adjusting section 22 is appropriately decided (in a step S1), and the heat furnace 3 is heated to obtain temperature detection data (time-based data of detected temperatures), while controlling supply power to the heater 31 by a thermo-controller 2. The steps of deciding values of P, I, and D are carried out, for example, by inputting numerical values into a controller 10 including a micro-computer from an input device not shown. In addition, the step of obtaining temperature detection data is carried out, for example, in the manner as follows. The inside of the heat furnace 3 is heated to a predetermined temperature with use of a sequence to be actually used in the processing, and then, a wafer boat 42 on which wafers W are mounted is conveyed into the heat furnace 3. Thereafter, the temperature is increased to a processing temperature.

Figure 5:
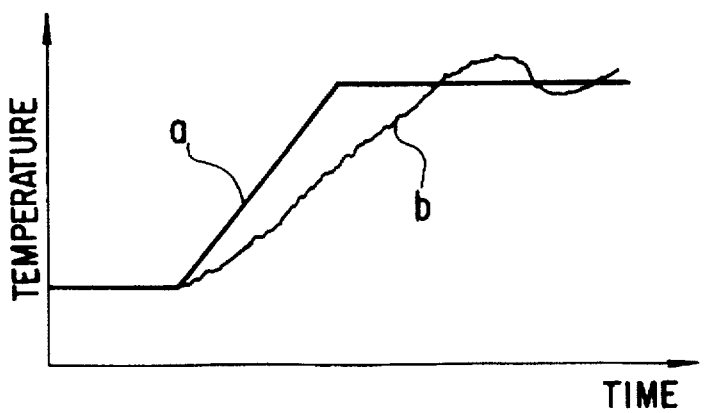
FIG. 5 is a characteristic graph showing target temperature data and detected temperature data of a heat furnace.
Figure 6:
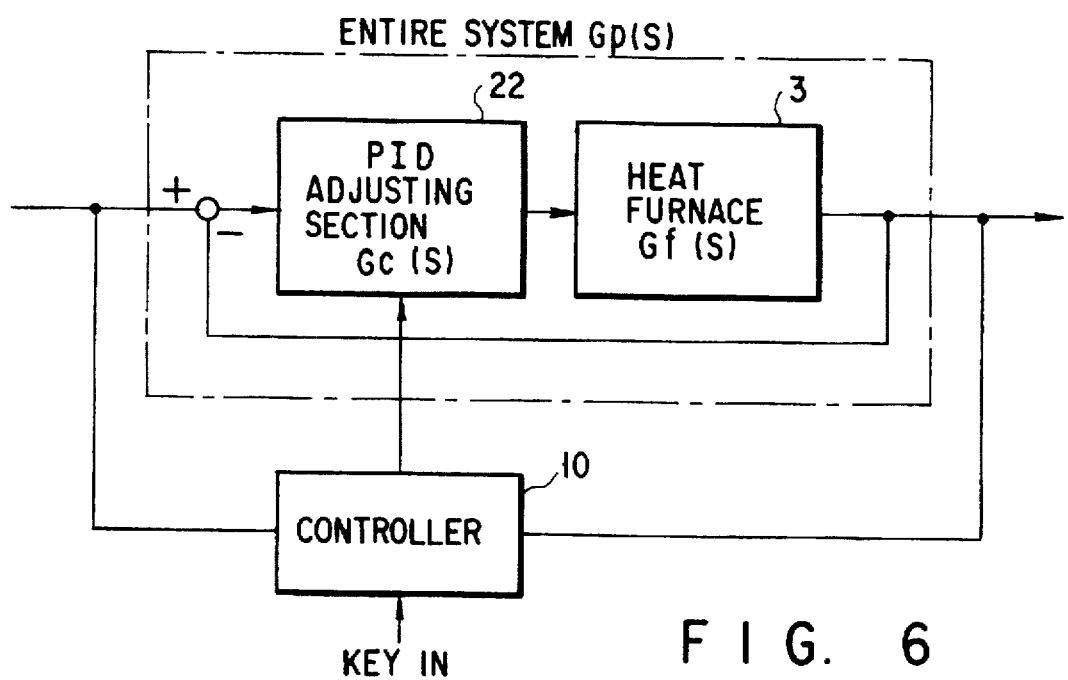
FIG. 6 is a block diagram showing a feed-back system according to an embodiment of the present invention.

FIG. 5 shows examples of temperature data a as a target and the temperature detection data b (actual measurement temperature) obtained by the steps described above. In the present invention, it is necessary how values P, I, and D should be decided in order to set the temperature data of actual processing as a target temperature. In this embodiment, a transfer function Gp of the entire system is obtained in a step S3, on the basis of the data b of FIG. 5, at first. The transfer function Gp of the entire system is a transfer function when the combination of the PID adjusting section 22 and the heat furnace 3 shown in FIG. 6 is taken as one black box, as has been explained with reference to FIG. 2.

Next, in a step S4, a transfer function Gf of the heat furnace 3 is obtained from the transfer function Gp of the entire system and values of P, I, and D appropriately decided in the step S1. An example of the way how the transfer function Gf of the heat furnace 3 will be explained below.

Here, a characteristic of Gp(s) is obtained as a transfer function of the entire system, and is subjected to approximation by the equation (6) as follows. Note that $S=j\omega$ is satisfied.

$$Gp(s) = \frac{a_0}{s^3 + a_2 \cdot s^2 + a_1 \cdot s + a_0} \quad (6)$$

Although the degree of the denominator of the above equation is three because of using PID adjustment, the degree of the denominator may be two if PI adjustment is adopted. Also, the scope of the present invention even includes a case in which PID adjustment is taken as two-dimensional delay approximation.

In addition, the transfer function Gc(s) of the PID adjusting section 22 is expressed by the equation (7) as follows. As a result of using this function, the transfer function of the entire system is expressed by the equation (6). Therefore, the transfer function Gf(s) of the heat furnace 3 itself can be expressed by the equation (8).

$$Gc(s) = P + \frac{1}{S} + D \cdot S \quad (7)$$

(P, I, and D are values obtained in the step S1.)

$$Gf(s) = \frac{B_0}{s^2 + A_1 \cdot s + A_0} \quad (8)$$

A relationship expressed by the following equation (9) substantially exists between the transfer function Gp(s) of the entire system, the transfer function Gc(s) of the PID adjusting section 22, and the transfer function Gf(s) of the heat furnace 3 itself. The following equation (10) will be obtained by substituting Gc(s) and Gp(s) into the equation (9) and by reorganizing the equation.

$$Gp = \frac{Gc(s) \cdot Gf(s)}{1 + Gc(s) \cdot Gf(s)} \quad (9)$$

$$Gp = \frac{B_0 \cdot D \cdot s^2 + B_0 \cdot P \cdot s + B_0 \cdot I}{s^3 + (A_1 + B_0 \cdot D) \cdot s^2 + (A_0 + B_0 \cdot P) \cdot s + B_0 \cdot I} \quad (10)$$

Therefore, supposing that Gp(s) of the equation (6) obtained from the actual measurement data is approximately equal to Gp(s) of the equation (10), the transfer function Gf(s) of the heat furnace 3 can be obtained. However, since the degree of the denominator of the equation (6) is different from that of the equation (10), these equations cannot be directly compared with each other to obtain A0, A1, and B0. Equations of both equations are hence expressed respectively by equations (11) and (12).

$$Gp(s) = \frac{1}{1 + \frac{a_1}{a_0} \cdot s + \frac{a_2}{a_0} \cdot s^2 + \frac{1}{a_0} \cdot s^3} \quad (11)$$

$$Gp(s) = \frac{1}{1 + \frac{A_0}{B_0 \cdot I} \cdot s + \frac{I \cdot A_1 - A_0 \cdot P}{B_0 \cdot I^2} \cdot s^2 + Z \cdot s^3 + \ldots} \quad (12)$$

where $$Z = \frac{I^2 - A_0 \cdot D \cdot I - P \cdot I \cdot A_1 + A_0 \cdot P^2}{B_0 \cdot I^3}$$

Note that the equation (12) is obtained by dividing the numerator and the denominator by a numerator polynomial and by further subjecting the denominator to series development.

Supposing that the coefficients of the denominators of the equations (11) and (12) are equal to each other, the following equation (13) will be obtained.

$$\frac{a_1}{a_0} = \frac{A_0}{B_0 \cdot I} \quad (13)$$

$$\frac{a_2}{a_0} = \frac{I \cdot A_1 - A_0 \cdot P}{B_0 \cdot I}$$

$$\frac{1}{a_0} = \frac{I^2 - A_0 \cdot D \cdot I - P \cdot I \cdot A_1 + A_0 \cdot P^2}{B_0 \cdot I}$$

These equations are taken as simultaneous equations, and A0, A1, and B0 are obtained. Then, the following equations (14) are obtained.

$$A0 = \frac{a1 \cdot I}{a1 \cdot D + I + a2 \cdot P} \quad (14)$$

$$A1 = \frac{a0 \cdot I}{a1 \cdot D + I + a2 \cdot P} \cdot \left\{ \frac{A0 \cdot P \cdot (a1 \cdot D + I + a2 \cdot P)}{a0 \cdot I^2} + \frac{a2}{a0} \right\}$$

$$B0 = \frac{a0}{a1 \cdot D + I + a2 \cdot P}$$

The transfer function Gf(s) of the heat furnace 3 is thus estimated.

Next, in a step S5 of FIG. 5, control parameters P, I, and D of the PID adjusting section to be used in actual processing are obtained on the basis of the transfer function Gf(s) of the heat furnace 3 and the transfer function Gr(s) as a target, i.e., the transfer function Gr(s) which should be realized in actual processing. The values P, I, and D are respectively taken as P0, I0, and D0, and the transfer function Gp(s) of the entire system as a target is expressed as GPO(S) by the following equation (15).

The equation (15) can also be expressed as in equation (16).

$$GpO(s) = \frac{\alpha 0}{s^3 + \alpha 2 \cdot s^2 + \alpha 1 \cdot s + \alpha 0} \quad (15)$$

$$Gp(s) = \frac{1}{1 + \frac{\alpha 1}{\alpha 0} \cdot s + \frac{\alpha 2}{\alpha 0} \cdot s^2 + \frac{1}{\alpha 0} \cdot s^3} \quad (16)$$

Here, since P0, I0, and D0 are used as control parameters of Gc(s), the transfer function Gp(s) of the entire system consisting of Gc(s) and Gf(s) is expressed by the following equation (17).

$$Gpf(s) = \frac{1}{1 + \frac{A0}{B0 \cdot Io} \cdot s + \frac{Io \cdot A1 - A0 \cdot Po}{B0 \cdot Io^2} \cdot s^2 + Z \cdot s^3 + \ldots} \quad (17)$$

where $$Z = \frac{Io^2 - A0 \cdot D \cdot Io - P \cdot Io \cdot A1 + A0 \cdot Po^2}{B0 \cdot Io^3}$$

Supposing that coefficients of respective terms of the equations (16) and (17) are equal to each other.

$$\frac{\alpha 1}{\alpha 0} = \frac{A0}{B0 \cdot Io} \tag{18}$$

$$\frac{\alpha 2}{\alpha 0} = \frac{Io \cdot A1 - A0 \cdot Po}{B0 \cdot Io^2}$$

$$\frac{1}{\alpha 0} = \frac{Io^2 - A0 \cdot Do \cdot Io - Po \cdot Io \cdot A1 + A0 \cdot Po^2}{B0 \cdot Io^3}$$

These equations are taken as simultaneous equations, and P0, I0, and D0 are obtained as the following equations (19).

$$Po = \frac{\alpha 0 \cdot A1 - \alpha 2 \cdot B0 \cdot Io}{\alpha 0 \cdot A0} \tag{19}$$

$$Io = \frac{\alpha 0 \cdot A0}{\alpha 1 \cdot B0}$$

$$Do = \frac{\alpha 0 \cdot Io - \alpha 0 \cdot A1 \cdot Po \cdot Io + \alpha 0 \cdot A0 \cdot Po^2 - B0 \cdot Io^3}{\alpha 0 \cdot A0 \cdot Io}$$

Specifically, values of P, I, and D of the transfer function of the PID adjusting section 22 capable of realizing a target characteristic are obtained as P0, I0, and D0 described above.

According to the embodiment described above, control parameters of the PID adjusting section 22 which are related to a plurality of stages of heaters 31 can be adjusted by one single temperature measurement. Therefore, adjustment can be carried out easily in a short time in comparison with a conventional method dependent on trial and error.

Here, if what and how control parameters should be adjusted to make control parameters close to a target characteristic can be found experimentally from results of the steps S1 to S3, the relationship between an adjust amount of a control parameter and an experiment item, e.g., the characteristic obtained by the adjust amount may be prepared as a program. Further, every time the values of P, I, and D are appropriately decided in the step S1, for example, the temperature of the heat furnace may be once increased at first, and then, values of P, I, and D which lead to a characteristic closer to the target characteristic may be obtained on the basis of the values of the temperature detection data obtained when the temperature of the heat furnace is thus once increased and the values of P, I, and D. Then, the flow shown in FIG. 3 may be carried out.

In the above case, the transfer function Gp(s) of the entire system may be subjected to approximation as a two-dimensional delay, as shown in the equation (20) below, and coefficients ($\zeta$ and $\omega$) may be obtained by a least square method.

$$Gp(s) = \frac{\omega^2}{s^2 + 2\zeta\omega s + \omega^2} = \frac{1}{1 + 2 \cdot \frac{\zeta}{\omega} \cdot s + \frac{1}{\omega^2} \cdot s^2} \tag{20}$$

In this case, if the transfer function Gf(s) of the heat furnace 3 is subjected to approximation as a two-dimensional delay as shown in the equation (21), the transfer function of the PID adjusting section 22 when a temperature measurement is carried out can be expressed by the equation (7), and therefore, the transfer function Gp(s) of the entire system obtained from calculations can be expressed as in the following equation (22).

$$Gf(s) = \frac{G \cdot \omega_1^2}{s^2 + 2\zeta_1 \cdot \omega_1 \cdot s + (\omega_1)^2} \tag{21}$$

$$\frac{1}{1 + \left[\frac{1}{(I \cdot G)}\right] \cdot s + \left[\frac{-1}{\omega_1} \cdot \frac{(-2 \cdot I \cdot \zeta_1 + P \cdot \omega_1)}{(I^2 \cdot G)}\right] \cdot s^2 + \lfloor L \rfloor \cdot s^3 + \ldots} \tag{22}$$

where $L = \frac{(I^2 - 2 \cdot P \cdot \omega_1 \cdot I \cdot \zeta_1 - \omega_1^2 \cdot D \cdot I + \omega_1^2 \cdot P^2)}{[I^3 \cdot (G\omega_1^2)]}$ By comparing the equations (20) and (22) with each other, $\zeta_1$, $\omega_1$, and G are obtained. The transfer function of the heat furnace 3 is thus obtained, and then, the transfer function of the entire system as a target is expressed as an approximation equation as shown in the following equation (23), and equations (23) and (24) below are compared with each other, with control parameters P, I, and D of the PID adjusting section 22 to be used in actual processing being respectively taken as P0, I0, and D0. Note that the following equation (24) is a transfer function on calculations obtained by synthesizing the transfer function of the PID adjusting section 22 and the transfer function of the heat furnace 3 together, so that P0, I0, and D0 are obtained as equations (24) by comparing both equations along the same way of thinking as in the embodiments described above.

$$\frac{\omega_0^2}{s^2 + 2\zeta 0 \cdot \omega 0 \cdot s + (\omega 0)^2} \tag{23}$$

$$\frac{1}{1 + \frac{1}{(I_0 \cdot G)} \cdot s + \left[\frac{1}{\omega_1} \cdot \frac{(2 \cdot I_0 \cdot \zeta_1 - P_0 \cdot \omega_1)}{(I_0^2 \cdot G)}\right] \cdot s^2 + [M] \cdot S^3 + \ldots} \tag{24}$$

where $$M = \frac{-(-I_0^2 + 2 \cdot P_0 \cdot \omega_1 \cdot I_0 \cdot S_1 + \omega_1^2 \cdot D_0 \cdot I_0 - \omega_1^2 \cdot P_0^2)}{[I_0^3 \cdot (G\omega_1^2)]}$$

$$I_0 = \frac{\omega_0}{(\zeta_0 \cdot \omega)} \cdot \zeta \cdot I$$

$$P_0 = \frac{1}{2} \cdot \frac{(-\omega \cdot \zeta \cdot I + \omega_0 \cdot I \cdot \zeta_0 + 2 \cdot \zeta \cdot \omega_0 \cdot P \cdot \omega \cdot \xi_0)}{(\omega^2 \cdot \zeta_0^2)}$$

$$D_0 = \frac{1}{4} \cdot \frac{(4 \cdot \omega_0^2 \cdot \zeta \cdot \zeta_0^2 \cdot P \cdot I \cdot G + 4 \cdot \omega_0^2 \cdot \zeta \cdot \zeta_0^2 \cdot \omega^2 \cdot D - N)}{[\omega^3 \cdot (\zeta_0^3 \cdot \omega_0)]} \tag{25}$$

where $N = I \cdot \omega \cdot \zeta_0 \cdot \omega^0 - 2 \cdot P \cdot \zeta \cdot \omega^2 \cdot \zeta_0 \cdot \omega_0 + \zeta \cdot I \cdot \omega^2$ The present invention may be applied to a lateral heat treatment instrument. Also, the present invention is not limited to a batch processing type heat treatment instrument, but may be applied to, for example, a heat treatment instrument of a type in which wafers are conveyed one after another, from downside into a vertical type reaction tube.

As has been explained above, according to the present invention, the temperature of the heat furnace is increased with control parameters of the PID adjusting section being appropriately decided, and the transfer function of the heat furnace is obtained on the basis of temperature detection data obtained when the temperature of the heat furnace is thus increased. Appropriate control parameters of the PID adjusting section are obtained from the transfer function of the heat furnace and the transfer function of the entire system as a target, in a manner contrarily to a conventional method. Therefore, control parameters of the PID adjusting section can be easily decided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A method of deciding temperature control parameters of a heat treatment instrument for performing a heat treatment on a target object, comprising steps of:

initializing temperature control parameters required for temperature-controlling the heat treatment instrument;

increasing a temperature of a heat furnace of the heat treatment instrument, in accordance with the temperature control parameters initialized;

obtaining a transfer function of an entire system of the heat treatment instrument, based on a heat treatment temperature of the heat furnace of the heat treatment instrument;

obtaining a transfer function of the heat furnace on the basis of the transfer function of the entire system and the initialized temperature control parameters;

obtaining temperature control parameters to be adopted in actual processing, based on a target transfer function of the entire system of the heat treatment instrument and the transfer function of the heat furnace.

2. A method of deciding temperature control parameters, according to claim 1, wherein the step of obtaining the temperature control parameters is step of setting values of P, I, and D or a proportional factor, an integral factor, and a differential factor in PID control, as the temperature control parameters.

3. A method of deciding temperature control parameters of a heat treatment instrument, comprising steps of:

appropriately deciding values of P, I, and D for PID control;

detecting a temperature of a heat furnace to be heated, based on the decided values of P, I, and D, to obtain temperature detection data;

obtaining a transfer function of an entire system of the heat treatment instrument, based on the temperature detection data;

obtaining a transfer function of the heat furnace, based on the transfer function of the entire system and the values of P, I, and D appropriately decided; and obtaining control parameters of P, I, and D to be used in actual processing, based on the transfer function of the heat furnace and an aimed target transfer function to be realized in actual processing.

4. An apparatus of deciding control parameters of a heat treatment instrument, comprising:

a temperature detect section provided in a heat furnace for subjecting a target object to a heat treatment;

an adjusting section for outputting a control signal for controlling supply power to a heat source of the heat furnace, from the control parameters based on a deviation between a detected temperature detected by the temperature detection section and a target temperature value;

first transfer function calculation means for obtaining a transfer function of an entire system including the adjusting section and the heat furnace, based on temperature detection data from the temperature detection section when a temperature of the heat furnace is increased;

second transfer function calculation means for obtaining a transfer function of the heat furnace, based on the transfer function of the entire system obtained by the transfer function calculation means and control parameters of the adjusting section used when obtaining the temperature detection data; and control parameter calculation means for obtaining control parameters of the adjusting section, to be used in a heat treatment, based on the transfer function obtained by the second transfer function calculation means and the transfer function of the entire system as a target.

5. An apparatus for deciding control parameters, according to claim 4, wherein the control parameter calculation means calculates values of P, I, and D for PID control, as the control parameters, and the adjusting section comprises a PID adjusting device for performing PID control on the heat furnace, based on the values of P, I, and D calculated by the control parameter calculation means.

6. An apparatus of deciding temperature control parameters of a heat treatment instrument, comprising:

PID setting means for appropriately setting values of P, I, and D for PID control;

a heat furnace to be heated, based on the values of P, I, and D appropriately set;

temperature detection means for detecting a temperature of the heat furnace, to obtain temperature detection data;

first calculation means for obtaining a transfer function of an entire system of the heat treatment apparatus, based on the temperature detection data;

second calculation means for obtaining a transfer function of the heat furnace, from the transfer function of the entire system and the set values of P, I, and D; and third calculation means for obtaining control parameters P, I, and D to be used in actual processing, based on the transfer function of the heat furnace and an aimed target transfer function to be realized in actual processing.

* * * * *